(12) United States Patent
Nordstrom et al.

(10) Patent No.: US 12,189,353 B2
(45) Date of Patent: Jan. 7, 2025

(54) WATERCRAFT SERVICING SYSTEM

(71) Applicant: TidalX AI Inc., San Ramon, CA (US)

(72) Inventors: Charles Nordstrom, Berkeley, CA (US); Matthew Aaron Knoll, Mountain View, CA (US); Neil Davé, San Mateo, CA (US)

(73) Assignee: TidalX AI Inc., Mountain View, CA (US)

( * ) Notice: Subject to any disclaimer, the term of this patent is extended or adjusted under 35 U.S.C. 154(b) by 0 days.

(21) Appl. No.: 17/531,410

(22) Filed: Nov. 19, 2021

(65) Prior Publication Data

US 2023/0161308 A1 May 25, 2023

(51) Int. Cl.
*G05B 19/042* (2006.01)

(52) U.S. Cl.
CPC .... *G05B 19/042* (2013.01); *G05B 2219/2619* (2013.01); *G05B 2219/2639* (2013.01)

(58) Field of Classification Search
None
See application file for complete search history.

(56) References Cited

U.S. PATENT DOCUMENTS

| | | |
|---|---|---|
| 3,934,531 A | 1/1976 | Allen |
| 6,167,831 B1 | 1/2001 | Watt et al. |
| 6,354,235 B1 | 3/2002 | Davies |
| 6,515,375 B1 | 2/2003 | Beal |
| 7,249,568 B1 | 7/2007 | Cultrara |
| 8,808,041 B2 | 8/2014 | Hine et al. |
| 9,988,129 B2 | 6/2018 | Jamieson et al. |
| 10,220,717 B2* | 3/2019 | Ricci ...................... B60L 53/63 |
| 10,725,469 B2 | 7/2020 | Harnett et al. |
| 10,856,520 B1 | 12/2020 | Kozachenok et al. |
| 11,376,979 B2* | 7/2022 | Chakraborty ........... B60L 53/36 |
| 11,397,087 B1 | 7/2022 | Mishra |
| 11,623,536 B2 | 4/2023 | Knoll et al. |
| 2002/0078873 A1 | 6/2002 | Fisher et al. |

(Continued)

FOREIGN PATENT DOCUMENTS

| | | |
|---|---|---|
| CL | 2019000039 | 3/2019 |
| CN | 203691007 | 7/2014 |

(Continued)

OTHER PUBLICATIONS

Extended Search Report in European Appln. No. 22151132.2, dated May 2, 2022, 10 pages.

(Continued)

*Primary Examiner* — Jason Lin
(74) *Attorney, Agent, or Firm* — Fish & Richardson P.C.

(57) ABSTRACT

A system for servicing watercraft includes one or more waterborne platforms. Each waterborne platform includes an electric power supply, a driving system for moving the waterborne platform in a body of water, a watercraft interfacing system configured to at least supply electric power to an electrically-powered watercraft, and a control interface configured to exchange data with a controller. The controller is configured to: receive input data, determine respective destination locations for the waterborne platforms to supply electric power to the electrically-powered watercraft, and send control data that includes data indicating the destination locations to the waterborne platforms.

17 Claims, 4 Drawing Sheets

(56) References Cited

U.S. PATENT DOCUMENTS

| | | |
|---|---|---|
| 2010/0047041 A1 | 2/2010 | Johnson |
| 2010/0320759 A1 | 12/2010 | Lightfoot et al. |
| 2011/0281478 A1 | 11/2011 | Blumenthal |
| 2011/0282807 A1 | 11/2011 | Colello et al. |
| 2012/0005031 A1 | 1/2012 | Jammer |
| 2012/0005125 A1 | 1/2012 | Jammer |
| 2012/0038210 A1 | 2/2012 | Kibbee |
| 2012/0158229 A1 | 6/2012 | Schaefer |
| 2012/0242275 A1 | 9/2012 | Kokusho |
| 2012/0249077 A1 | 10/2012 | Carmel |
| 2012/0271758 A1 | 10/2012 | Jammer |
| 2014/0110527 A1 | 4/2014 | Sing |
| 2014/0232200 A1 | 8/2014 | Maekawa |
| 2014/0347017 A1* | 11/2014 | Sugano ............... B60L 53/122 320/137 |
| 2015/0217837 A1 | 8/2015 | Szydlowski et al. |
| 2015/0219404 A1 | 8/2015 | Pietsch et al. |
| 2015/0294329 A1 | 10/2015 | Saito et al. |
| 2016/0225105 A1 | 8/2016 | Hill |
| 2016/0363671 A1 | 12/2016 | Anderson et al. |
| 2017/0015397 A1 | 1/2017 | Mitchell et al. |
| 2017/0150701 A1 | 6/2017 | Gilmore et al. |
| 2018/0086212 A1* | 3/2018 | Dudar ............... H04B 5/0037 |
| 2018/0107210 A1 | 4/2018 | Harnett et al. |
| 2018/0354591 A1 | 12/2018 | Burt et al. |
| 2019/0061885 A1 | 2/2019 | Baro et al. |
| 2019/0228218 A1 | 7/2019 | Barnaby et al. |
| 2019/0340440 A1 | 11/2019 | Atwater et al. |
| 2019/0351773 A1* | 11/2019 | Merritt .................. B60L 53/51 |
| 2020/0107524 A1 | 4/2020 | Messana et al. |
| 2020/0155882 A1 | 5/2020 | Tohidi et al. |
| 2020/0262305 A1 | 8/2020 | Chakraborty et al. |
| 2020/0282857 A1 | 9/2020 | Mortensen et al. |
| 2020/0288678 A1 | 9/2020 | Howe et al. |
| 2020/0406765 A1 | 12/2020 | Mikalsen |
| 2021/0162874 A1* | 6/2021 | Lee ..................... H02J 7/0048 |
| 2021/0221476 A1 | 7/2021 | Szydlowski et al. |
| 2021/0300507 A1 | 9/2021 | Corcoran |
| 2021/0347275 A1* | 11/2021 | Chakraborty ......... B60L 53/53 |
| 2021/0380007 A1 | 12/2021 | Merritt |
| 2021/0383485 A1 | 12/2021 | Markham |
| 2022/0111752 A1 | 4/2022 | Hoeven |
| 2022/0122464 A1 | 4/2022 | Franklin et al. |
| 2022/0153393 A1 | 5/2022 | Jiang |
| 2023/0064567 A1* | 3/2023 | Knoll ..................... G06Q 10/04 |
| 2023/0064908 A1 | 3/2023 | Knoll et al. |
| 2023/0198071 A1* | 6/2023 | Matsumura ........... G06Q 10/08 429/90 |

FOREIGN PATENT DOCUMENTS

| | | | |
|---|---|---|---|
| CN | 108040948 | | 5/2018 |
| CN | 108973738 A | * | 12/2018 |
| CN | 111819133 A | * | 10/2020 ............ B60L 53/12 |
| DE | 102014013707 A1 | * | 3/2016 ............ F03B 13/20 |
| EP | 2244934 | | 11/2010 |
| EP | 3484283 | | 5/2019 |
| JP | 2002171853 | | 6/2002 |
| KR | 20100065542 | | 6/2010 |
| NO | 300401 | | 5/1997 |
| NO | 20160199 | | 8/2017 |
| WO | WO 1990/007874 | | 7/1990 |
| WO | WO 1997/019587 | | 6/1997 |
| WO | WO 2009/008733 | | 1/2009 |
| WO | WO 2009/097057 | | 8/2009 |
| WO | WO 2012/081990 | | 6/2012 |
| WO | WO 2014/179482 | | 11/2014 |
| WO | WO 2017/137896 | | 8/2017 |
| WO | WO 2018/011744 | | 1/2018 |
| WO | WO 2018/011745 | | 1/2018 |
| WO | WO 2019/002881 | | 1/2019 |
| WO | WO 2019/121851 | | 6/2019 |
| WO | WO 2019/182300 | | 9/2019 |
| WO | WO 2019/188506 | | 10/2019 |
| WO | WO 2019/232247 | | 12/2019 |
| WO | WO 2020/046524 | | 3/2020 |
| WO | WO 2020/132031 | | 6/2020 |
| WO | WO 2021/006744 | | 1/2021 |
| WO | WO 2021/030237 | | 2/2021 |
| WO | WO 2022/010815 | | 1/2022 |
| WO | WO 2020/072438 | | 4/2022 |

OTHER PUBLICATIONS

International Preliminary Report on Patentability in International Appln. No. PCT/US2020/059829, dated May 27, 2022, 11 pages.
International Search Report and Written Opinion in International Appin No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.
International Search Report and Written Opinion in International Appln No. PCT/US2022/022492, dated Jun. 28, 2022, 13 pages.
International Search Report and Written Opinion in International Appin No. PCT/US2022/022589, dated Jul. 7, 2022, 12 pages.
International Search Report and Written Opinion in International Appln No. PCT/US2022/022837, dated Aug. 2, 2022, 14 pages.
International Search Report and Written Opinion in International Appln No. PCT/US2022/023831, dated Jul. 8, 2022, 13 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
International Search Report and Written Opinion in International Appln. No. PCT/US2020/059829, dated Feb. 25, 2021, 18 pages.
Qiu et al., "Improving Transfer Learning and Squeeze-and-Excitation Networks for Small-Scale Fine-Grained Fish Image Classification," IEEE Access, Dec. 2018, 6(31):78503-78512.
Stein et al., "Consistent melanophore spot patterns allow long-term individual recognition of Atlantic salmon Salmo Salar," Journal of Fish Biology, Nov. 2017, 91(6):1699-1712.
International Search Report and Written Opinion in International Appln. No. PCT/US2022/033067, dated Oct. 27, 2022, 44 pages.
International Search Report and Written Opinion International Appln No. PCT/US2022/018651, dated Jun. 22, 2022, 14 pages.
International Search Report and Written Opinion International Appln No. PCT/US2022/021683, dated Jun. 27, 2022, 14 pages.
International Search Report and Written Opinion International Appln No. PCT/US2022/022250, dated Jul. 6, 2022, 15 pages.
International Search Report and Written Opinion International Appln No. PCT/US2022/022492, dated Jun. 28, 2022, 13 pages.
International Search Report and Written Opinion International Appln No. PCT/US2022/022589, dated Jul. 7, 2022, 12 pages.
International Search Report and Written Opinion International Appln No. PCT/US2022/023831, dated Jul. 8, 2022, 13 pages.
Office Action in Canadian Appln. No. 3,183,722, dated Apr. 18, 2023, 4 pages.
PCT International Search Report and Written Opinion in International Appln. No. PCT/US2020/059829, dated Feb. 25, 2021, 18 pages.
Shipinsight.com [online], "Wartsila to develop autonomous container barge for Rotterdam as part of MAGPIE Project," May 27, 2021, retrieved on Aug. 31, 2021, retrieved from URL<https://shipinsight.com/articles/wartsila-to-develop-autonomous-container-barge-for-rotterdam-as-part-of-magpie-project/>, 2 pages.

* cited by examiner

WATERCRAFT SERVICING SYSTEM

FILED

This specification relates to systems for servicing watercrafts, for example, for providing electrical power to watercrafts.

BACKGROUND

Powering waterborne vessels, such as boats, ships, and hovercrafts, using electrical power provides a number of advantages, including, for example, reducing air and water pollutions, reducing noise, and requiring fewer and less costly maintenance. Further, electricity can be a renewable energy resource, and thus powering waterborne vessels with renewable electrical power can support energy sustainability and security, and reduce carbon footprints for operating the waterborne vessels.

However, powering waterborne vessels with batteries can be challenging for long-distance ocean or waterway transits. High capacity batteries are heavy to carry, causing battery-powered long transits to be inefficient. Additionally, batteries typically require long recharging times, which can cause delays in shipping schedules when recharging is performed in port.

SUMMARY

This specification describes techniques, methods, systems, and other approaches for servicing watercrafts, for example, for providing electrical power to watercrafts on their navigation routes. The watercrafts can be battery-powered waterborne vessels, such as boats, ships, and hovercrafts, along their travel routes.

In one innovative aspect, this specification describes a system for servicing watercraft. The system includes one or more waterborne platforms. Each waterborne platform includes an electric power supply, a driving system for moving the waterborne platform in a body of water, a watercraft interfacing system configured to at least supply electric power to an electrically-powered watercraft, and a control interface configured to exchange data with a controller. The controller is configured to: receive input data, determine respective destination locations for the waterborne platforms to supply electric power to the electrically-powered watercraft, and send control data that includes data indicating the destination locations to the waterborne platforms.

In some implementations of the system, the electrical power supply includes a renewable energy source. The driving system can be powered at least in part by a renewable energy source. For example, the renewable energy source can include one or more wind turbines.

In some implementations of the system, the waterborne platform further includes a conversion system configured to reconfigure the wind turbine between a first mode and a second mode. When operating in the first mode, the wind turbine is configured to convert wind power to electric power. When operating in the second mode, the wind turbine is configured to function as a wind sail to propel the first waterborne platform.

In some implementations of the system, the waterborne platform further includes a battery recharging system configured to recharge a battery. The watercraft interfacing system of the waterborne platform can include a battery exchange system configured to exchange batteries with the electrically-powered watercraft.

In some implementations of the system, the waterborne platform is further configured to support aquaculture in the body of water.

In some implementations of the system, the system comprises a plurality of waterborne platforms including the first waterborne platform, and the controller is configured to determine respective destination location for each of the plurality of waterborne platforms, and send respective control data to each of the plurality of waterborne platforms.

In some implementations of the system, the destination locations for the plurality of waterborne platforms are arranged along one or more shipping routes in the body of water.

This specification also describes a controller for sending control data to one or more waterborne platforms. The controller includes one or more computers and one or more storage devices storing instructions that when executed by the one or more computers cause the one or more computers to: obtain input data, determine, based on the input data, the respective control data for each respective waterborne platform in the one or more waterborne platforms, and sends the respective control data to each of the waterborne platforms. The respective control data includes data indicating a respective target location for the respective waterborne platform.

In some implementations of the controller, wherein the input data includes data indicating a respective current location of each of the one or more electrically-powered watercrafts. The input data can further include respective navigation task information for each of the one or more electrically-powered watercrafts. The respective navigation task information can include a respective destination location, and optionally, one or more stop locations, for the respective electrically-powered watercraft.

In some implementations of the controller, the input data includes data indicating shipping route information of the body of water. The input data can also include data indicating one or more of: weather information, wind information, or wave properties information.

In some implementations of the controller, the input data includes data indicating, for each of the one or more waterborne platforms, a respective current location, a respective current power generation status, and a battery inventory status.

In some implementations of the controller, to determine the respective control data for each of the waterborne platforms comprises, the controller optimizes an objective function with respect to the respective target locations for the one or more waterborne platforms. The objective function can include one or more of: a component that measures an energy expenditure, a component indicating an energy harvesting efficiency for the waterborne platforms, a component indicating a cost, or a component indicating an incentive for one or more desired shipping routes.

This specification also describes a method for controlling one or more waterborne platforms. The method is implemented by the controller as described above.

This specification also describes a method for servicing watercrafts. The method is performed by a waterborne platform. The waterborne platform receives control data that includes data indicating a destination location of the first waterborne platform, moves to the destination location, harvests electric power from the renewable energy source, and supplies a portion of the electric power to an electrically-powered watercraft.

Among other advantages, implementations of the techniques provided by this specification may reduce environmental impacts of watercrafts while improving operational efficiency, energy efficiency, and safety.

By receiving electrical energy from one or more waterborne platforms, a watercraft, e.g., a marine vessel such as a cargo ship, can transit across oceans primarily using electricity from batteries. Charging the batteries at sea can improve operational efficiency since the marine vessel can continue to travel along shipping routes while charging from the watercraft. This can reduce recharging and/or refueling time required in port and can increase availability of land-based refueling stations.

In some cases, the watercraft carrying the batteries can recharge from photovoltaic, tidal, and/or wind-powered charging stations arranged on one of the waterborne platforms. Thus, the watercraft can be powered using a sustainable energy source, improving energy efficiency and reducing environmental impacts.

Because the batteries of the watercraft can be regularly recharged during transit, the batteries can be smaller than would be necessary for powering the watercraft for an entire voyage. Thus, the batteries can be lighter and can occupy a smaller volume of space in the marine vessel. Lighter, smaller batteries can enable the watercraft to travel at faster speeds and carry more cargo. Carrying lighter and smaller batteries can also improve safety of the marine vessel due to a reduced risk of fire and explosion caused by thermal runaway.

The waterborne platforms can be controlled to move to their respective destination locations. The system can determine, in real time and dynamically, optimal destination locations for the waterborne platforms to service a plurality of watercrafts. For example, the destination locations can be selected according to one or more of: the current locations of the watercrafts, the navigation route information of the watercrafts, the battery status of the watercrafts, the weather information, the wave information, the energy generation status of the waterborne platforms, the location and status of protected marine life, and so on. The system can determine the optimal destination locations of the waterborne platforms to achieve one or more objectives, such as minimizing energy expenditure of the watercrafts, minimizing navigation time of the watercrafts to complete the respective navigation tasks, maximizing energy harvesting potentials of the waterborne platforms, to incentivize the watercrafts to avoid regions of protected marine life, and so on. These features of the system described herein provide further improvements on energy efficiency, operational efficiency, environmental protection, and flexibility to incentivize desirable navigation routes for the watercrafts.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

The components shown here, their connections and relationships, and their functions, are meant to be exemplary only, and are not meant to limit the implementations described and/or claimed in this document.

DETAILED DESCRIPTION

Figure 1A:
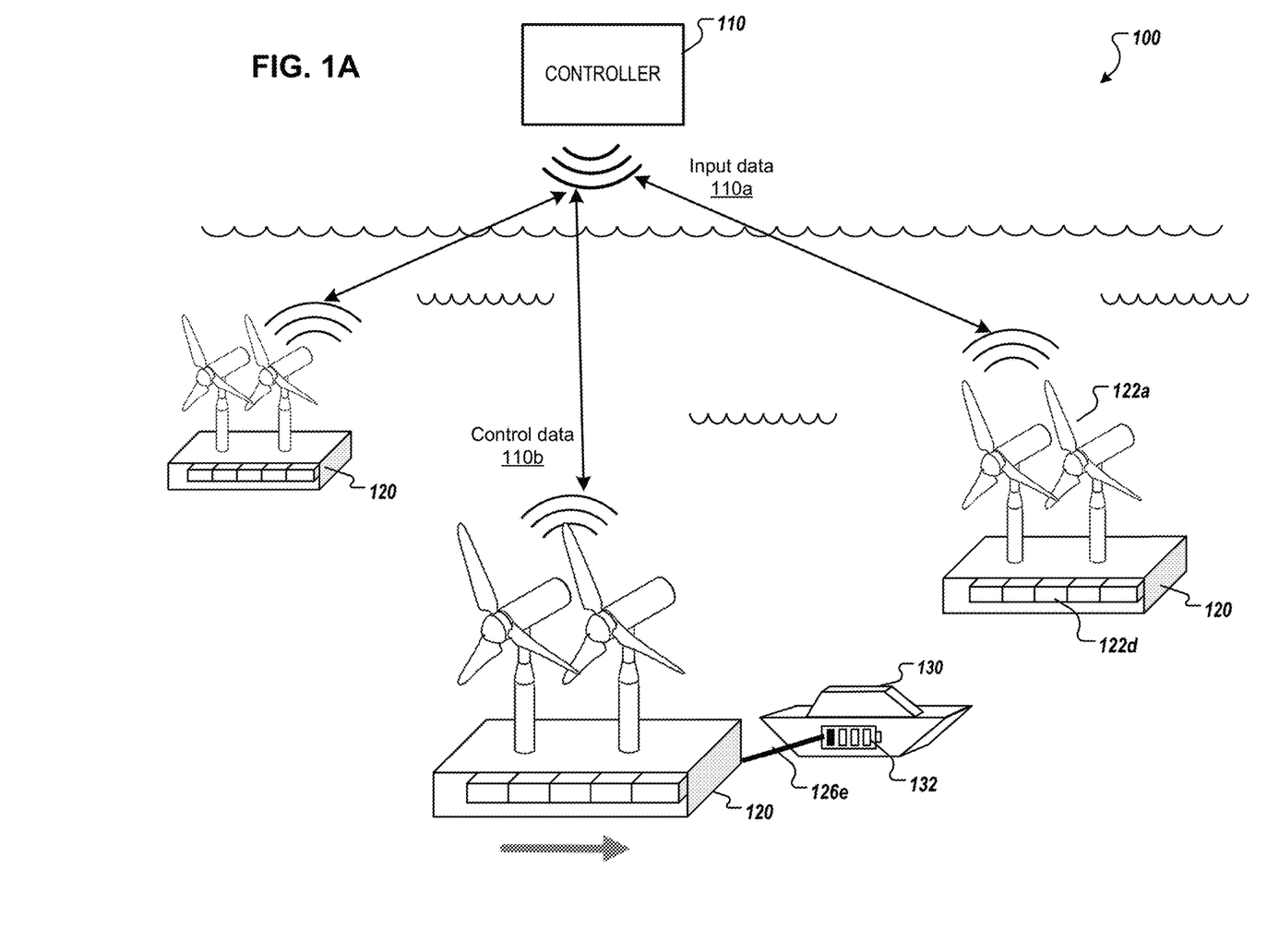
FIG. 1A shows an example system for servicing watercrafts.

FIG. 1A shows an example of an example system 100 for servicing watercrafts. In particular, the system 100 is configured to provide electricity to one or more electrically-powered watercrafts 130 navigating in a body of water. The system 100 includes one or more waterborne platforms 120 for supplying electricity to the watercrafts 130 and a controller 110 for providing control data to the waterborne platforms 120.

The operations of the controller 110 can be implemented as computer programs on one or more computers in one or more locations. For example, the controller 110 can be implemented by computers located in one or more locations that are off-board the waterborne platforms 120, such as being located in a centralized location. In another example, the controller 110 can be partially or completely implemented by computers located on one or more of the waterborne platforms 120. The controller 110 can exchange data with the waterborne platforms 120. In some implementations, the controller 110 can further exchange data with one or more of the watercrafts 130.

Figure 1B:
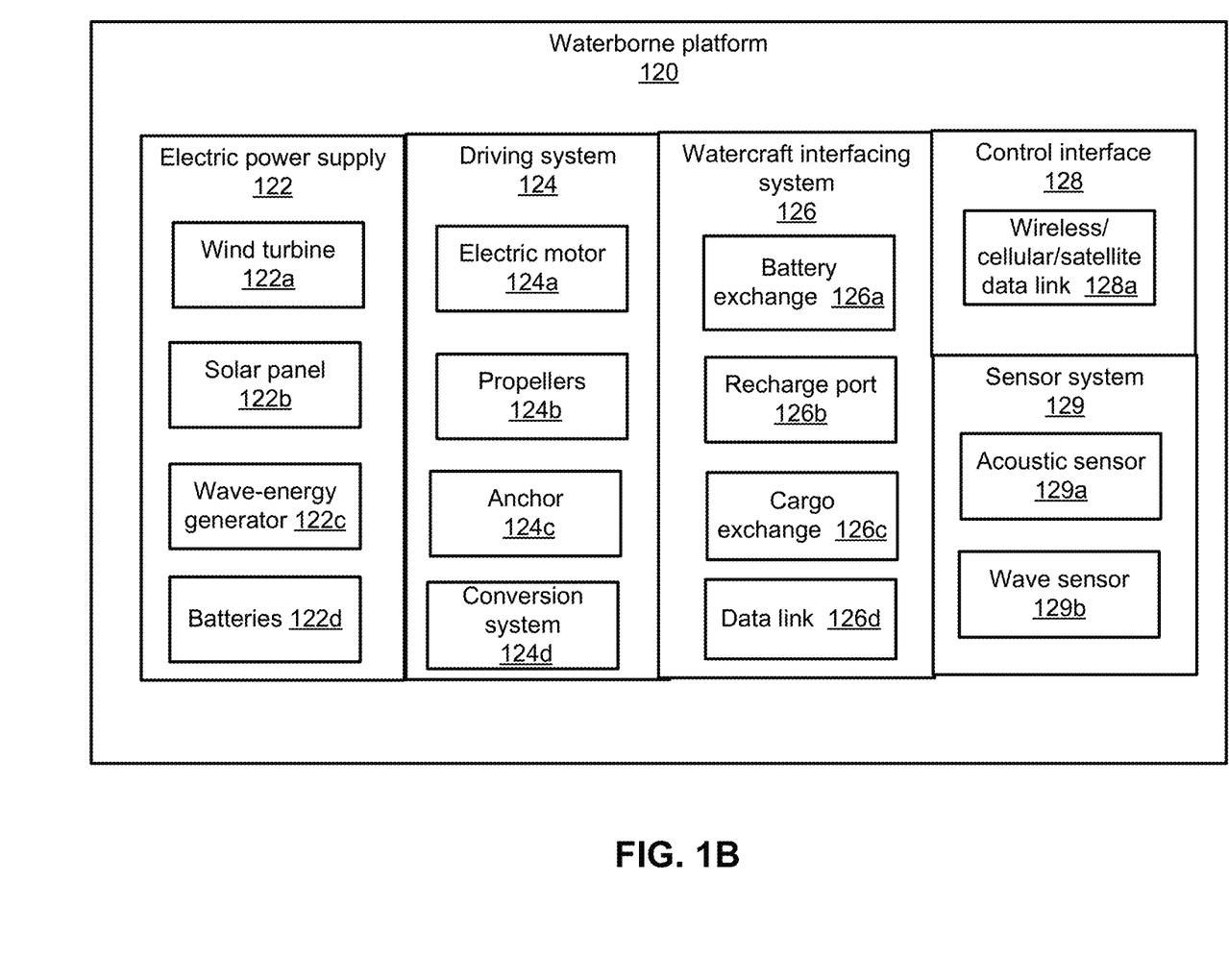
FIG. 1B shows components of an example waterborne platform for servicing watercrafts.

An example of the waterborne platform 120 is described with reference to FIG. 1B. In general, referring to FIG. 1A and FIG. 1B, the waterborne platform 120 at least includes an electric power supply 122, a driving system 124 for moving waterborne platform in the body of water, a watercraft interfacing system 126 configured to at least supply electric power to the electrically-powered watercraft 130, and a control interface 128 configured to exchange data with the controller 110, while the controller 110 is configured to receive input data 110a, determine respective destination locations for the waterborne platforms 120 to supply electric power to the watercrafts 130, and send control data 110b that includes data indicating the destination location to the respective waterborne platform 120.

In some implementations, the electrical power supply 122 of the waterborne platform 120 includes a renewable energy source, and optionally, the driving system 124, such as the electrical motor 124a configured to drive the propellers 124b, of the waterborne platform 120 can be powered by the renewable energy source. In one example, the renewable energy source includes one or more wind turbines 122a.

In one particular example, the waterborne platform further includes a conversion system 124d configured to reconfigure the wind turbine 122a between a first mode and a second mode. When operating in the first mode, i.e., wind turbine mode, the wind turbine 122a is configured to convert wind power to electric power. When operating in the second mode, the wind turbine 122a is configured to function as a wind sail to propel the waterborne platform 120. Reconfiguration of the wind turbine 122a can be performed according to conditions such as waterborne platform location, wind condition, power status of the waterborne platform 120, and whether the waterborne platform 120 is navigating. For example, when the waterborne platform 120 needs to navigate to the destination location and the wind conditions are suitable, the conversion system can convert the wind turbine 122a to the second (wind sail) mode to function as a wind sail to propel the waterborne platform 120. This conversion capability can maximize the utility of wind power. The conversion system can be implemented by one or more actuation systems configured to relocate and/or rotate the blades of the wind turbine 122a.

Alternatively or in addition, the electrical power supply 122 of the waterborne platform 120 can include other renewable energy sources such as one or more solar panels 122b and a wave energy generator 122c. In some implementations, the waterborne platform 120 is configured to store batteries 122d in a bottom portion of the waterborne platform. The batteries 122d can be rechargeable batteries that can be charged by the power supply of the waterborne platform 120.

The watercraft interfacing system 126 of the waterborne platform 120 can include a battery exchange system 126a configured to exchange batteries with the electrically-powered watercraft. For example, when the watercraft 130 is docked at a specific location next to the waterborne platform 120, one or more actuators of the battery exchange system 126a can mechanically swap a battery 132 loaded on the watercraft 130 with a fully charged battery 122d of the waterborne platform 120.

Alternatively or additionally, the watercraft interfacing system 126 of the waterborne platform 120 can include a battery recharging system, e.g., a recharge port 126b, configured to recharge the battery 132 when the watercraft 130 is docked at next to the waterborne platform 120.

In some implementations, the recharge port 126b can be configured on a mechanical element that can be controlled to extend from and withdraw back to the waterborne platform 120. For example, the recharge port 126b can be configured on a retractable boom 126e, e.g., a telescopic arm controlled by actuators. When the waterborne platform 120 receives control data including a command for the waterborne platform 120 to recharge the battery 132 of a nearby watercraft 130, the driving system 124 of the waterborne platform 120 can move the waterborne platform 120 to a predetermined short distance away from the nearby watercraft 130, and the watercraft interfacing system 126 of the waterborne platform 120 can control the telescopic arm to extend from the waterborne platform 120 to connect the recharge port 126b with a connection port of the watercraft 130 to recharge the battery 132.

In some implementations, the retractable boom can be configured to retract and extend in response to motion, so that forces are not transmitted.

In some implementations, the driving system 124 of the waterborne platform 120 can move the waterborne platform 120 along with the watercraft 130 during battery recharging, so the watercraft 130 does not need to be anchored during recharging. In particular, the waterborne platform 120 can maintain distance with the watercraft 130 by controlling the driving system 124 based on real-time measurement of a distance between the first waterborne platform 120 and the watercraft 130. The distance measurements can be obtained by distance sensor of the waterborne platform 120.

After recharging is completed, the watercraft interfacing system 126 of the waterborne platform 120 can control the boom to withdraw back to the waterborne platform, and thus disconnect the recharge port 126b from the connection port of the watercraft 130.

In some implementations, the watercraft interfacing system 126 further includes cargo exchange system 126c configured to exchange cargo with the electrically-powered watercraft 130. The cargo exchange system 126c can include actuators for mechanically moving cargos, and a sensing device, such as a camera or a scanner, for recognizing the cargo to be exchanged. Thus, in addition to providing electricity, the waterborne platform 120 can further service the watercrafts as a cargo storage transfer center. In some implementations, the watercraft interfacing system 126 of the waterborne platform 120 further includes a data link 126d configured to exchange data with the electrically-powered watercraft 130.

In some implementations, the waterborne platform 120 further includes an anchor 124c configured to secure the waterborne platform to an anchored location (e.g., the destination location determined by the controller 110), when the waterborne platform is not moving.

In some implementations, the waterborne platform 120 further includes a sensor system 129 for obtaining parameters of the environment. For example, the sensor system 129 can include an acoustic sensor 129a, configured to sense acoustic signals, e.g., from marine life such as whales. The sensed acoustic signal can help in determining optimal destination locations of the waterborne platforms to incentivize the watercrafts to use navigation routes that have minimum impact on protected marine species. In another example, the sensor system 129 can include a wave sensor 129b for measuring wave conditions. The measurement data generated by the wave sensor 129b can help in determining optimal destination locations of the waterborne platforms to avoid regions with unfavorable wave conditions.

In some implementations, the waterborne platform 120 is further configured to support aquaculture in the body of water. For example, waterborne platform 120 can further include a marine aquaculture system that cultivates the growth of aquatic life, such as fish. Marine aquaculture systems have already been in existence and deployed in offshore locations. For example, a marine aquaculture system can include a submerged cage configured to maintain and store the aquatic cargo, such as salmon, in the open ocean and allow the cargo to move freely and be monitored. By combining a watercraft-servicing platform with the marine aquaculture system, an efficient, multi-purpose system can be formed. In some implementations, one or more of the watercrafts 130 can be service crafts for the marine aquaculture system. For example, these watercrafts can be used to transport the aquatic cargo, or the feed, maintenance equipment, and inspectors for the aquatic cargo. The watercrafts 130 can also be configured to perform one or more of: feeding, harvesting, or monitoring of the aquaculture. By integrating the marine aquaculture system with the watercraft-servicing components of the waterborne platform 120, the system 100 can provide electricity to the watercrafts 130 while the watercrafts 130 are servicing the marine aquaculture system.

The waterborne platforms 120 can be controlled to move to their respective destination locations according to the control data 110b received by the control interface 128 from the controller 110. The control interface 128 can be equipped with one or more of: a wireless, a cellular, or a satellite data links.

The controller 110 is configured to determine respective destination locations for the waterborne platforms 120 according to the input data 110a received from the waterborne platforms 120, and optionally, from one or more of the waterborne platforms 130. In some implementations, the controller 110 can further receive the input data 110 from other data source, such as the internet.

The input data 110 can include position and route information for the watercrafts 130. For example, the input data 110 can include a respective current location of each watercrafts 130 and/or the respective navigation task information of each watercrafts 130. The navigation task information can include, for example, a respective destination location, and optionally one or more stop locations for the respective watercraft.

The input data 110 can include electrical power usage information for the watercraft 130. For example, the input data 100 can include a respective current power level for each watercraft. The input data 100 can further include respective power consumption information for each watercraft, such as data on power consumption per unit distance for one or more speeds of the watercraft.

The input data 110 can include data indicating shipping route information of the body of water. For example, the input data 100 can include a map of the usual shipping route distribution in the body of water. In some implementations, the shipping route information includes seasonal trends of the shipping route distribution, including, for example, an indicator of how busy a particular shipping route is during a specified time frame.

The input data 110 can include additional environmental information such as weather information, wind information, or wave properties information. In some implementations, the input data 110 includes data indicating locations of protected marine life, such as protected marine life being observed and reported by one or more of the waterborne platforms 120.

The input data 110 can include data indicating a respective current location of each waterborne platform 120. The input data 110 can further include data indicating a respective current power generation status and/or a battery inventory status for each waterborne platform.

The controller 110 can determine, based on the input data 110a, in real time and dynamically, optimal destination locations for the waterborne platforms to service a plurality of watercrafts. For example, the destination locations for the waterborne platforms 120 can be arranged along one or more shipping routes in the body of water.

In some implementations, the destination locations can be selected according to one or more optimization criteria. For example, the controller 110 can determine, based on the input data 110a, the respective control data 110b for each of the waterborne platforms 120 by optimizing an objective function with respect to the respective target locations for the one or more waterborne platforms 120.

The controller 110 can use any suitable algorithm to solve the optimization problem. Examples of the optimization process includes: Newton's method, sequential quadratic programming, gradient descent, conditional gradient method, simultaneous perturbation stochastic approximation (SPSA), and so on. In some implementations, a machine-learning model can be used to generate the destination locations based on the input data 110a. The machine-learning model can be trained using data collected in the past, and can include one or more of: a linear regression model, a linear discriminant model, a logistic regression model, a support-vector machine model, a decision tree model, a k-nearest neighbor's model, or a neural network model.

In some implementations, the destination locations for the waterborne platforms 120 are optimized for energy efficiency. That is, the objective function includes a component that measures an energy expenditure. The energy expenditure can include the energy required for one or more of the electrically-powered watercrafts 130 to each complete a respective navigation task conditioned on the waterborne platforms being located at the respective target locations. In determining the destination locations of the waterborne platforms for optimizing energy efficiency, the controller 110 can take into consideration the current locations, navigation task information, and electrical power usage information of the watercraft 130. Alternatively or additionally, the controller 110 can take into consideration the shipping route information of the body of water. For example, the controller 110 can designate more waterborne platforms at locations close to the busiest shipping routes, so that the watercrafts on these routes can have easy access to one or more waterborne platforms.

In some implementations, the energy expenditure includes a weighted sum of energy required for each of a plurality of the electrically-powered watercrafts 120 to complete a respective navigation task conditioned on the waterborne platforms being located at the respective target locations. The weighted sum can include weighting coefficients assigned to each of the plurality of electrically-powered watercrafts.

In some implementations, the destination locations for the waterborne platforms 120 are optimized for energy harvesting efficiency of the waterborne platforms 120. That is, the objective function can include a component indicating an energy harvesting efficiency for the waterborne platforms.

In some implementations, the destination locations for the waterborne platforms 120 can be optimized for minimizing a cost for the watercrafts 130 to complete their respective navigation tasks. For example, each watercraft may have a cost associated with unit navigation time or distance. The cost component of the objective function can be used to minimize a weighted total cost for the watercrafts. The objective function can include a component indicating a cost for the watercrafts conditioned on the destination locations of the waterborne platforms.

In some implementations, destination locations for the waterborne platforms 120 are optimized for incentivizing the watercrafts to use desired shipping routes or avoid particular shipping routes. For example, the controller 110 can select the destination locations for the waterborne platforms to be stationed away from a certain region, e.g., a region that is known for a protected marine species to be present.

Figure 2:
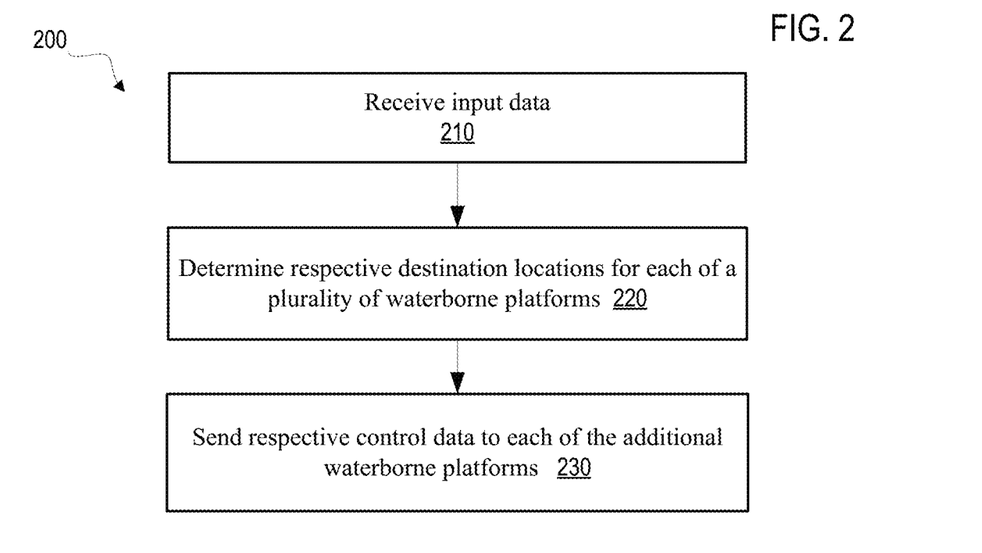
FIG. 2 is a flow diagram of an example process for controlling waterborne platforms configured to service watercrafts.

FIG. 2 is a flow diagram illustrating an example process 200 for controlling waterborne platforms configured to service watercrafts. For convenience, the process 200 will be described as being performed by a system of one or more computers located in one or more locations. For example, the controller 110 of the system 100 of FIG. 1A, appropriately programmed in accordance with this specification, can perform the process 200 to control the waterborne platforms configured to service watercrafts.

In step 210, the controller receives input data. In step 220, the controller determines the respective destination locations for the waterborne platforms. In step 230, the controller sends respective control data to each of the waterborne platforms, where the control data including data indicates the destination locations of the waterborne platforms. Details of the steps in the process 200 have been described with reference to FIG. 1 and FIG. 2, and are not repeated herein.

Figure 3:
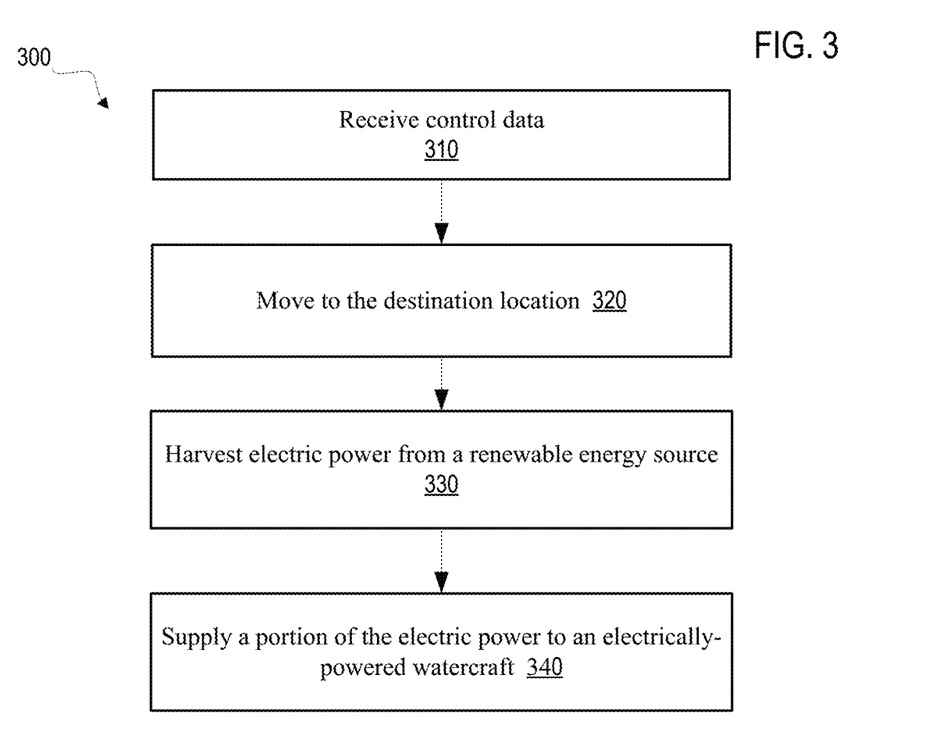
FIG. 3 is a flow diagram of an example process for a waterborne platform to service watercrafts.

FIG. 3 is a flow diagram illustrating an example process 300 for a waterborne platform to service watercrafts. For convenience, the process 300 will be described as being performed by the waterborne platform 120 described in FIG. 1A and FIG. 1B.

In step 310, the waterborne platform receives control data from a controller. The control data includes data indicating a destination location for the waterborne platform. In step 320, the waterborne platform moves to the destination location, e.g., by using a driving system of the waterborne platform. In step 330, the waterborne platform harvests electric power from a renewable energy source, e.g., by using one or more of a wind turbine, a solar panel, and/or a wave energy generator. In step 340, the waterborne platform supplies supplying a portion of the harvested electric power to an electrically-powered watercraft, e.g., by swapping rechargeable batteries with the watercraft or by supplying a charging port to the watercraft. Certain details of the steps in the process 300 have been described with reference to FIG. 1 and FIG. 2, and are not repeated herein.

Figure 4:
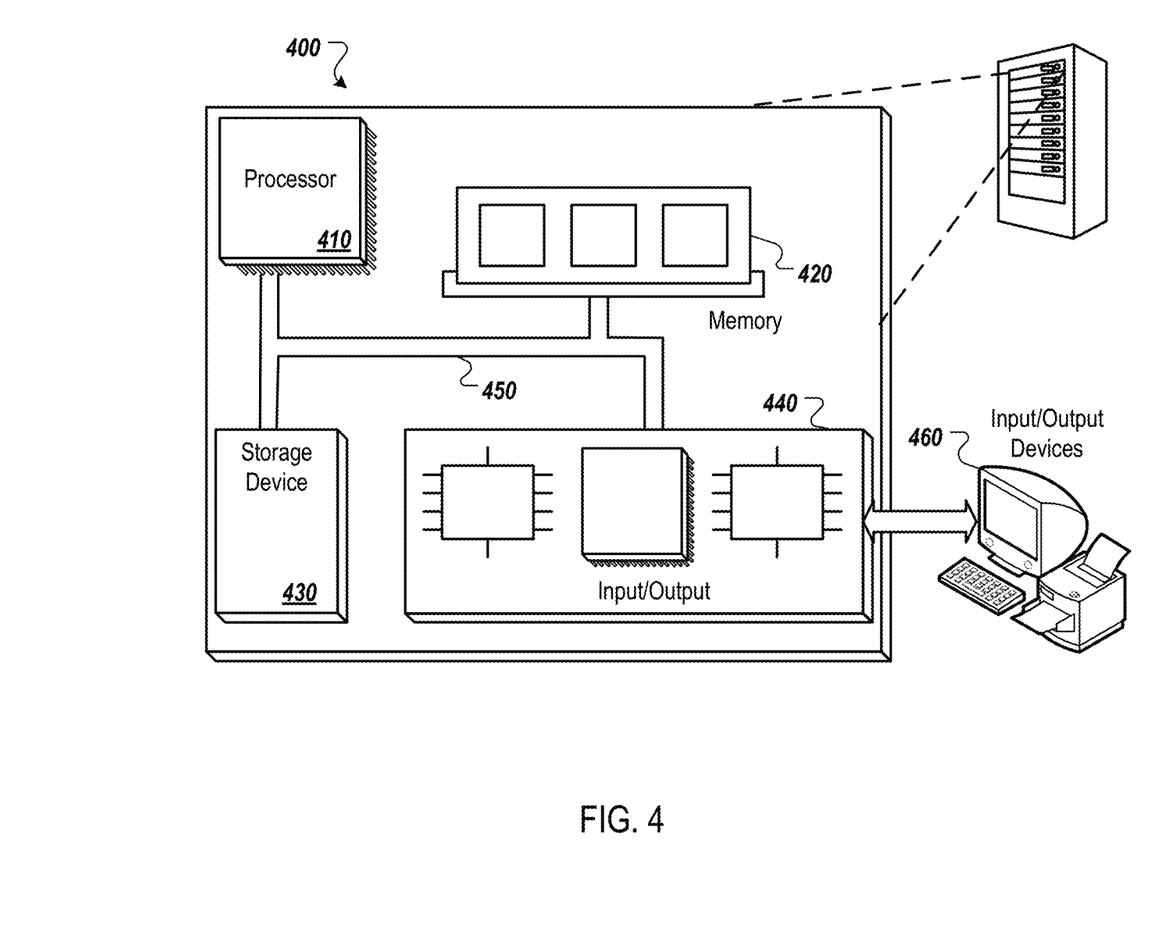
FIG. 4 shows an example computer system for implementing certain operations described in this specification.

FIG. 4 shows an example computer system 400 that can be used to perform certain operations described above, for example, to perform the operations of the controller 110 in the system 100 of FIG. 1. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (for example, a cloud storage device), or some other large-capacity storage device.

The input/output device 440 provides input/output operations for the system 400. In one implementation, the input/output device 440 can include one or more network interface devices, for example, an Ethernet card, a serial communication device, for example, a RS-232 port, and/or a wireless interface device, for example, a 502.11 card. In another implementation, the input/output device can include driver devices configured to receive input data and send output data to other input/output devices, for example, keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of nonvolatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of messages to a personal device, for example, a smartphone that is running a messaging application and receiving responsive messages from the user in return.

Data processing apparatus for implementing machine learning models can also include, for example, special-purpose hardware accelerator units for processing common and compute-intensive parts of machine learning training or production, that is, inference, workloads.

Machine learning models can be implemented and deployed using a machine learning framework, for example, a TensorFlow framework, a Microsoft Cognitive Toolkit framework, an Apache Singa framework, or an Apache MXNet framework.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for servicing watercrafts, comprising:
a controller;
one or more waterborne platforms including a first waterborne platform, the first waterborne platform comprising:
an electric power supply,
a driving system configured to move the first waterborne platform in a body of water,
a watercraft interfacing system comprising a recharging port configured to supply electric power to one or more electrically-powered watercrafts, and a control interface configured to exchange data with the controller;
wherein the controller is configured to:
receive input data; determine a respective target location for each of the one or more waterborne platforms to supply electric power to the one or more electrically-powered watercrafts, comprising applying the input data to an objective function of an optimization process associated with the respective target locations, the objective function including a first component specifying an energy required for the one or more electrically-powered watercrafts to each complete a respective navigation task conditioned on the one or more waterborne platforms being located at the respective target locations, and a second component specifying (i) an energy harvesting efficiency for the one or more waterborne platforms to harvest renewable energy at the respective target locations or (ii) an incentive for the one or more electrically-powered watercrafts to avoid a region for protected marine species;
send control data that includes data specifying the respective target location to each of the one or more waterborne platforms; and
wherein the driving system of first waterborne platform is configured to move the first waterborne platform based on the control data.

2. The system of claim 1, wherein the electrical power supply includes a renewable energy source.

3. The system of claim 2, wherein the driving system is powered at least in part by the renewable energy source.

4. The system of claim 2, wherein the renewable energy source includes one or more of wind turbines.

5. The system of claim 4, wherein the first waterborne platform further comprises a conversion system configured to reconfigure the wind turbine between a first mode and a second mode, wherein the wind turbine is configured to convert wind power to electric power when operating in the first mode, and configured to function as a wind sail to propel the first waterborne platform when operating in the second mode.

6. The system of claim 1, wherein the recharging port is configured on a retractable boom, and the first waterborne platform is configured to, in response to receiving control data including a command to recharge a nearby watercraft: move to a predetermined distance from the nearby watercraft;
extend the retractable boom from the first waterborne platform to cause the recharging port to connect with a connection port of the nearby watercraft to recharge a battery of the nearby watercraft; and
when the recharging is completed, withdraw the retractable boom to disconnect the recharging port from the connection port of the nearby watercraft, wherein:
during recharging, the first waterborne platform is configured to maintain a distance with the nearby watercraft by controlling the driving system based on real-time measurement of the distance between the first waterborne platform and the nearby watercraft.

7. The system of claim 1, wherein the watercraft interfacing system further comprises a battery exchange system configured to exchange batteries with the one or more electrically-powered watercrafts.

8. The system of claim 1, wherein the system comprises a plurality of waterborne platforms including the first waterborne platform, and the controller is configured to determine respective target location for each of the plurality of waterborne platforms, and send respective control data to each of the plurality of waterborne platforms.

9. The system of claim 8, wherein the respective target locations for the plurality of waterborne platforms are arranged along one or more shipping routes in the body of water.

10. The system of claim 1, wherein the objective function further includes a third component specifying a total cost for the one of more electrically-powered watercrafts to complete their respective navigation tasks conditioned on the one or more waterborne platforms being located at the respective target locations.

11. A waterborne platform for servicing electrically-powered watercrafts, comprising:
a controller;
an electric power supply,
a driving system for moving the waterborne platform in a body of water,
a watercraft interfacing system comprising a recharging port configured to supply electric power to one or more electrically-powered watercrafts, and
wherein the controller is configured to:
receive input data;
determine a target location for the waterborne platform to supply electric power to the one or more electrically-powered watercrafts, comprising applying the input data to an objective function of an optimization process associated with the target location, the objective function including a first component specifying an energy required for the one or more electrically-powered watercrafts to each complete a respective navigation task conditioned on the one or more waterborne platforms being located at the respective target location, and a second component specifying (i) an energy harvesting efficiency for the waterborne platform to harvest renewable energy at the target location or (ii) an incentive for the one or more electrically-powered watercrafts to avoid a region for protected marine species; and
wherein the driving system is configured to move the first waterborne platform to the target location.

12. The platform of claim 11, wherein the electrical power supply includes a renewable energy source.

13. The platform of claim 12, wherein the driving system is powered at least in part by the renewable energy source.

14. The platform of claim 12, wherein the renewable energy source includes one or more of wind turbines.

15. The platform of claim 14, further comprising a conversion system configured to reconfigure the wind turbine between a first mode and a second mode, wherein the wind turbine is configured to convert wind power to electric power when operating in the first mode, and configured to function as a wind sail to propel the first waterborne platform when operating in the second mode.

16. The platform of claim 11, wherein the recharging port is configured on a retractable boom, and the waterborne platform is configured to, in response to receiving control data including a command to recharge a nearby watercraft:
  move to a predetermined distance from the nearby watercraft;
  extend the retractable boom from the waterborne platform to cause the recharging port to connect with a connection port of the nearby watercraft to recharge a battery of the nearby watercraft; and
  when the recharging is completed, withdraw the retractable boom to disconnect the recharging port from the connection port of the nearby watercraft, wherein:
    during recharging, the waterborne platform is configured to maintain a distance with the nearby watercraft by controlling the driving system based on real-time measurement of the distance between the waterborne platform and the nearby watercraft.

17. The platform of claim 11, wherein the watercraft interfacing system further comprises a battery exchange system configured to exchange batteries with the one or more electrically-powered watercrafts.

* * * * *